Aug. 29, 1961
A. W. ECKSTROM
2,998,060
HIGH TEMPERATURE METHOD AND EVAPORATOR
FOR CONCENTRATING SOLUTIONS
Filed Aug. 3, 1960
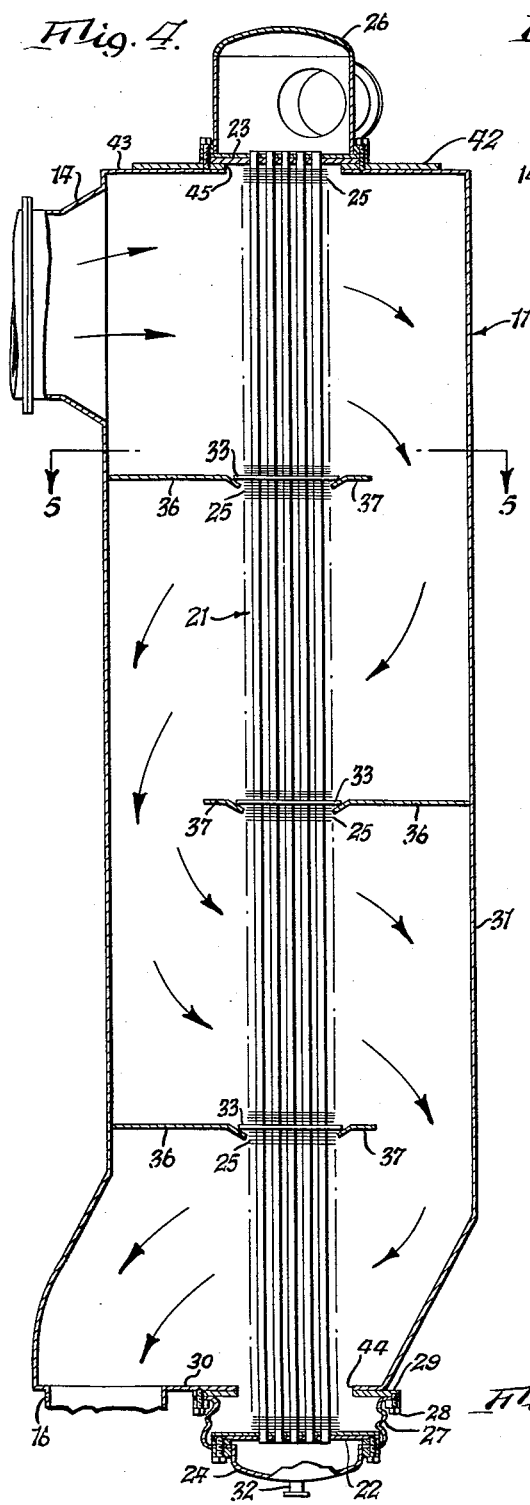
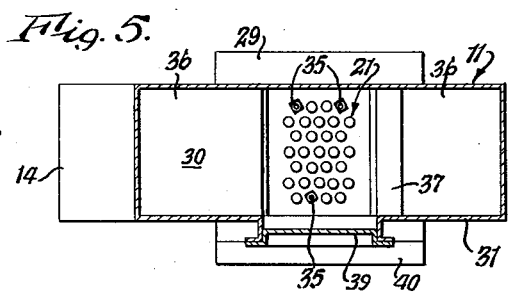
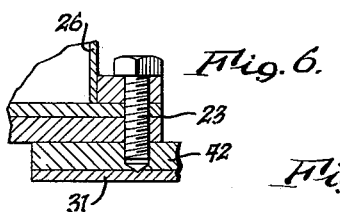
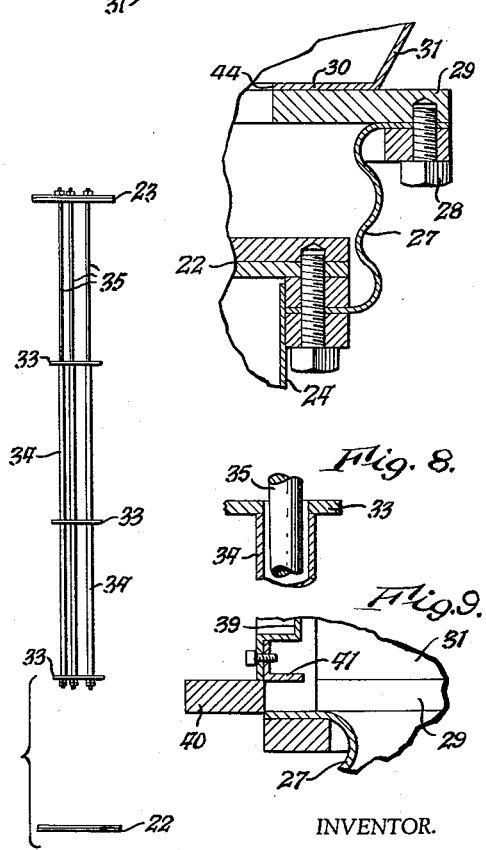
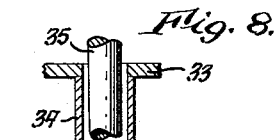
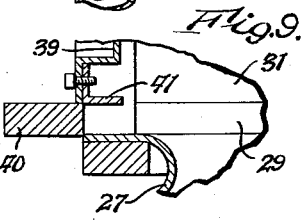
INVENTOR.
Albert W. Eckstrom
BY
Popp and Sommer
Attorneys.

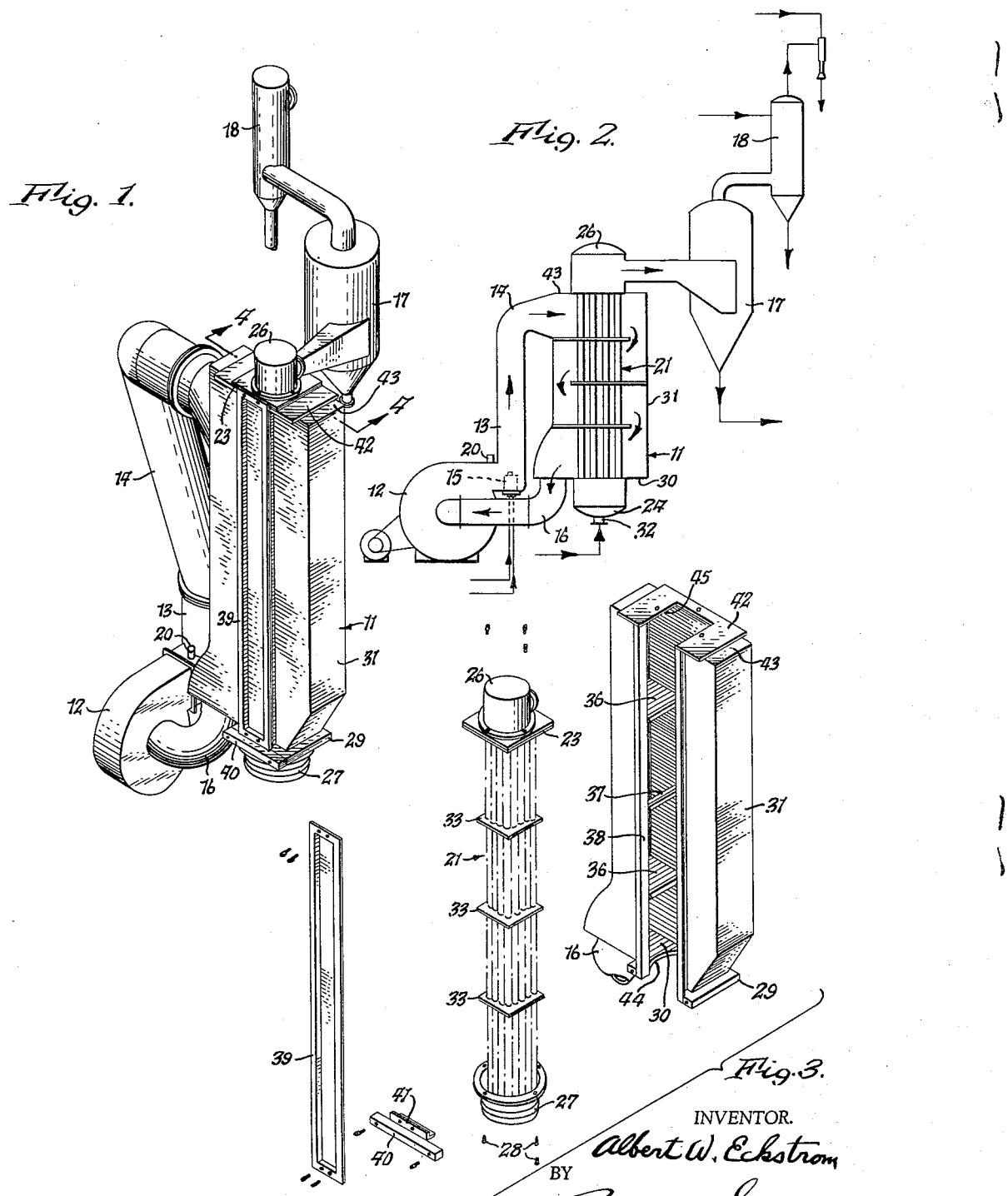

United States Patent Office 2,998,060
Patented Aug. 29, 1961

2,998,060
HIGH TEMPERATURE METHOD AND EVAPORATOR FOR CONCENTRATING SOLUTIONS
Albert W. Eckstrom, Snyder, N.Y.
Filed Aug. 3, 1960, Ser. No. 47,325
5 Claims. (Cl. 159—28)

This invention relates to a high temperature method and apparatus for concentrating solutions through heat exchange relation with the hot products of combustion of a burning fuel and is more particularly shown as embodied in a single pass evaporator for producing caustic soda and caustic potash, although the invention can be embodied in the first effect of a multiple effect evaporator.

This application is a continuation in part of my co-pending application, bearing the same title, now abandoned, Serial No. 728,006, filed April 11, 1958.

The method of evaporating and the evaporator of the present invention is adapted to resist the deleterious effects of certain factors entering into the processing of corrosive solutions, such as of caustic soda and caustic potash, so as to provide satisfactory service for long periods of operation. The evaporator of the invention is especially well suited for producing substantially anhydrous or water free caustic soda and caustic potash, which in the past has most often been accomplished by coal, gas or oil fired pots. The use of pots for production of batches of such caustic soda and caustic potash is a very inefficient operation due to the large volume of caustic soda or potash in a given batch and the high temperature required to drive off the final moisture. In addition, the batch process for production of substantially water free caustic soda and caustic potash produces fumes which are very corrosive to equipment and the surrounding buildings, and are repugnant to the comfort and health of the operating personnel.

It has also been proposed to produce substantially anhydrous caustic soda and caustic potash by heat exchange with an organic high temperature heat transfer media, such as oil or a mixture of 26.5'% diphenyl and 73.5% diphenyl oxide but such media tend to break down at temperatures considerably below those desirable for the production of caustic soda and caustic potash, the mixture breaking down at 750° F.

The evaporator of the present invention is shown as embodied in a direct fired, single pass evaporator, for production of substantially water free caustic soda and caustic potash, having recirculation of the products of combustion to increase the operating efficiency, and to cool and control the temperature of the products of combustion.

An object of this invention is to provide a direct fired, high temperature evaporator operable at temperatures above those obtainable with the use of some molten salts, oils or other high temperature heat transfer media and which is capable of being closely controlled, particularly as to temperatures at different points of the system.

Another object of the invention is to provide a direct fired, single pass continuous process evaporator, for processing substantially water free caustic soda and caustic potash.

Another object of the invention is to provide an evaporator heated by direct heat transfer with hot products of combustion and having a recirculation of combination gases to increase the operating efficiency, and to cool the products of combustion to a controlled level.

A further object is to provide an evaporator which may be easily assembled and serviced, and which has a low operating cost.

Another object is to provide an evaporator which operates at atmospheric pressure, to avoid the need for a stationary engineer, thus not only making for a less hazardous operation, but one with low operating costs.

Another object is to provide a continuous and easily controlled process by which the above objects are achieved.

These and further objects and features of the invention will become more apparent from the following description and accompanying drawings wherein:

FIG. 1 is a perspective view of a direct fired evaporator arrangement embodying the principles of the invention;

FIG. 2 is a schematic illustration of the evaporator arrangement of FIG. 1;

FIG. 3 is an exploded perspective view of the evaporator shown in FIG. 1;

FIG. 4 is an enlarged section view as seen generally from line 4—4 in FIG 1;

FIG. 5 is a section view as seen from line 5—5 in FIG. 4;

FIGS. 6–9 are enlarged fragmentary views of portions of the evaporator of FIG. 3; and FIG. 10 is a view of a tie rod arrangement used in the evaporator of FIG. 3.

Referring now to the drawings, and more particularly to FIGS. 1 and 2, an evaporator arrangement representative of an embodiment of the invention includes an evaporator casing 11; a gas-fired heating system for the evaporator comprising a fan blower 12, a combustion chamber shell 13, a duct leading from the upper end of the combustion chamber to the upper end of the evaporator casing 11, a generally horizontal recirculation duct 16 connecting the inlet of the blower with the lower end of the evaporator casing 11, and an outlet duct 20 in the outlet of said fan blower 12 discharging a part of the gas discharged from the fan blower to the atmosphere; a vapor separator 17; and a condenser 18 for the vapors generated in the evaporator casing. A burner 15 is arranged to burn fuel, such as gas and air, in the combustion chamber shell 13 whereby hot products of combustion are forced by the blower 12 upwardly in the duct 14 into the upper end of the evaporator casing 11. The blower also serves to draw the products of combustion downwardly through the evaporator casing 11 into the horizontal recirculation duct 16 from where it passes through the fan blower into the combustion chamber shell 13 for recirculation in the evaporator. A certain amount of the recirculated products of combustion is vented to the atmosphere by the outlet duct 20.

The evaporator casing 11, as best seen in FIG. 4, has a tube bundle which includes a plurality of tubes 21, the lower end of each being affixed to a tube sheet 22, while the upper end of each is affixed to a tube sheet 23, which arrangement allows the tubes to open into a lower header 24 and an upper header 26 of the tube bundle, respectively. Each tube 21 is shown as having an extended surface in the form of a plurality of fins 25 arranged along its length for improved heat transfer. The lower header 24 is shown as connected to a tubular annularly corrugated expansion sleeve 27, the upper end of which is affixed by fastening means, such as screws 28, to a horizontal base piece or bottom plate 29, which is secured to and forms part of the bottom wall 30 of the evaporator casing 11, the side walls of which are indicated at 31. A fluid inlet pipe 32 opens into the lower header 24 for delivery of the caustic solution to be processed thereto.

A plurality of baffle plates 33 having holes receiving the tubes 21, are arranged in spaced relation by means of spacer tubes 34 and tie rods 35, the upper ends of the tie rods being bolted to the upper tube sheet 23, whereby the baffle plates 33 maintain the tubes of the tube bundle in regularly spaced relation. The plates 33 serve as part of a baffle plate system which functions to direct the products of combustion forming the heating medium in a serpentine path as it flows downwardly in the evaporator casing 11, and generally perpendicular to the axes of the tubes. Each baffle plate 33 coacts with a wide stationary horizontal plate 36 which is mounted in and engages three of the side walls 31 of the evaporator casing, these being the front, back and one side wall, and a stationary narrow plate 37 which is secured at each end to the front and rear walls of the evaporator casing 11. The end edges of the plates 36 and 37 nearest the tubes 21, are bent downwardly to project under the edges of the plates 33 fixed to the tube bundle. In such manner the tube bundle comprising the tubes 21 and bottom and top headers 24 and 26 respectively, may be removed as a unit from the evaporator housing 11.

For such purpose, a vertical opening 38 is provided in the front wall of the housing 11, which extends the full height of this front wall and can be closed by a removable door, or cover 39, the upper end of which is bolted to the edge of the tube sheet 23, the lower edge being bolted to an angle iron 41, which is welded to a cross piece 40, the latter being bolted to the casing base plate 29. The upper tube sheet 23, is fixed to a cover plate 42 which is secured to and forms part of the top wall 43 of the evaporator casing 11. Each of the casing plates 29 and 42 and hence the bottom and top walls 30 and 43 of the evaporator casing 11, is provided with a horizontal opening, indicated at 44 and 45, respectively, which forms a continuation of the vertical opening 38 to permit the insertion and removal of the tube bundle in the casing.

Operation

At temperatures above about 750° F. high temperature heat transfer media such as the aforesaid mixture of diphenyl and diphenyl oxide and some molten salts and oils begin to break down and hence the present invention, utilizing directly the heat of the products of combustion of burning fuel, is particularly adapted for use with evaporators where the temperature of the heating medium is desirable in excess of about 750° F. For example, it is particularly desirable for the production of substantially water free caustic soda or caustic potash where high temperatures are desirable to drive the last bit of water from the aqueous solution in a single pass evaporator.

In processing of caustic soda or caustic potash, an aqueous solution of, say 70% caustic is fed to the evaporator 11 through the inlet 32 into the lower header 24 and tubes 21 at a temperature of, say, approximately 260° F. The temperature of the products of combustion leaving the combustion chamber 13 and entering the upper end of the evaporator casing 31 is above 1000° F., preferably approximately 1000°–1300° F. The horizontal baffle plates in this shell cause the hot products of combustion to traverse a sinusoidal path back and forth across the tubes in traveling downwardly through the evaporator. Through contact with the tubes the temperature of the products of combustion is reduced to approximately 400°–650° F. The products of combustion at this temperature are forcibly withdrawn through the duct 76 by the blower 12 and a part is returned to the combustion chamber 13, the other part being vented through the vent duct 20. Fuel and air is continuously supplied to the burner 15 to produce fresh hot products of combustion, which are cooled by the products of combustion returned by the blower to produce the desired combustion chamber outlet temperature of 1000°–1300° F. The greater the amount of returned products of combustion the cooler the gases leaving the combustion chamber, this temperature also being controlled, of course, by the amount of fuel and air supplied to the burner 15. The temperature of the vapor and caustic soda and potash leaving the upper header 26 is in the order of 710° F. and at this temperature the caustic is produced in substantially water free liquid form, the liquid settling to the bottom of the separator 17. The water vapors pass to the condenser 18 where they are condensed into liquid form.

By operating at these higher temperatures, danger of solidification of the caustic soda or caustic potash, particularly in the lower part of the tubes of the evaporator, on shut down for a few minutes is avoided, as well as danger of the formation of slush solids in the tubes, with resulting percolation or pulsating action in the tubes, on passing through a temporary solid phase range of temperature and concentration of the product.

As a specific example of the practice of the invention, the temperature of the products of combustion entering the evaporator casing from the duct 14 was 1175° F.; the temperature of the products of combustion leaving the evaporator through the duct 16 was 625° F.; the temperature of caustic soda leaving the evaporator at a concentration of 99.7% solids under a vacuum of 25½ inches of mercury referred to atmosphere was 750° F.; and the temperature of the caustic soda solution at 70% solids, entering at the inlet 32, was 260° F.

From the foregoing, it will be seen that the principles of the invention may be utilized for construction of a direct fired evaporator, which will provide satisfactory operation for prolonged periods in the processing of caustic chemical solutions. More particularly, it will be seen that an evaporator embodying the principles of the invention will be especially suited for processing a caustic soda and potash solution in a single pass and continuous manner, as to completely satisfy the objectives of the invention.

What is claimed is:

1. A single pass evaporator, comprising a vertically arranged evaporator casing, means providing a combustion chamber, a burner in said combustion chamber adapted for combustion of a fuel and air mixture, a duct conducting the hot products of combustion to one end of said evaporator casing, a plurality of vertical tubes in said evaporator casing and exposed to the hot products of combustion passing through said casing, an outlet header at said one end of said evaporator casing and connected to the corresponding ends of said tubes to receive the heated material in process issuing therefrom, an inlet header at the other end of said evaporator casing and connected to the corresponding other ends of said tubes to deliver the material to be heated thereto, a fan blower having its outlet connected to said combustion chamber, an outlet duct in said fan blower outlet discharging a part of the air discharged from the fan to the atmosphere, and a duct connecting the inlet of said fan blower with said other end of said evaporator casing.

2. A single pass evaporator, comprising a vertically arranged evaporator casing, means providing a combustion chamber arranged at one side of said evaporator casing, a burner in said combustion chamber adapted for combustion of a fuel and air mixture, a duct conducting the hot products of combustion to the upper end of said evaporator casing, a plurality of vertical tubes in said evaporator casing exposed to the hot products of combustion passing through said casing, an upper outlet header at the upper end of said evaporator casing and connected to the upper ends of said tubes to receive the heated material in process issuing therefrom, a lower inlet header at the lower end of said evaporator casing and connected to the lower ends of said tubes to deliver the material to be heated thereto, a fan blower at said lower end of said evaporator casing and having an outlet connected to said combustion chamber, an outlet duct in said fan blower outlet discharging a part of the gas discharged from the fan to the atmosphere, and a generally horizontal duct connecting the inlet of said fan blower with said lower end of said evaporator casing.

3. An evaporator, comprising a vertically arranged evaporator casing having top, bottom and side walls, one of said side walls having a vertical opening extending from the upper to the lower end thereof, said top wall having an opening forming a horizontal continuation of said vertical opening, said bottom wall having an opening forming a horizontal continuation of said vertical opening, a tube bundle comprising an upper header above and mounted on said top wall to cover said opening therein, a lower header below said opening in said bottom wall, and a plurality of vertical tubes connecting said headers and extending through said openings in said top and bottom walls and removable through said vertical opening with said headers as a complete tube bundle, and a cover for said vertical opening and extending from the top to the bottom of said casing.

4. An evaporator as set forth in claim 3 wherein said tubes carry at least one horizontal baffle plate of a width in one horizontal dimension less than the width of said vertical opening whereby said tube bundle with its baffle plate can be removed through said vertical opening, and a horizontal baffle plate mounted in said casing to one side of said vertical opening and extending from said one of said side walls to the opposite side wall coplanar with said first mentioned baffle plate to form a continuation thereof and deflect vertically moving gases in said casing to traverse a serpentine path.

5. The continuous process of concentrating aqueous solutions of caustic soda and caustic potash which comprises moving a stream of said solution having an entering temperature of about 260° F. along a path, moving a stream of hot products of combustion countercurrent and in heat exchange relation to said stream of said solution a sufficient distance to reduce the temperature of said products of combustion to about 400°–650° F., adding a part of said products of combustion at said temperature of about 400°–650° F. to the inlet end of said stream of hot products of combustion in an amount to provide an initial temperature above about 1000° F. of said stream of hot products of combustion coming into contact with said stream of solution whereby the temperature of the vapor and caustic soda leaving heat exchange relation with said hot products of combustion is in the order of 710° F. and substantially free from water, and separating said substantially water free caustic soda from said vapor.

References Cited in the file of this patent

UNITED STATES PATENTS

| | | |
|---|---|---|
| 1,270,621 | Kestner | June 25, 1918 |
| 1,501,646 | Brown | July 15, 1924 |
| 1,623,773 | Bell | Apr. 5, 1927 |
| 1,688,325 | Bell | Oct. 23, 1928 |
| 2,073,236 | Wild et al. | Mar. 9, 1937 |
| 2,464,487 | Chappell et al. | Mar. 15, 1949 |
| 2,476,666 | Keller | July 19, 1949 |
| 2,698,779 | Adams et al. | Jan. 4, 1955 |

FOREIGN PATENTS

| | | |
|---|---|---|
| 1,100,530 | France | Sept. 21, 1955 |

OTHER REFERENCES

Metals & Controls Corp.: "Product Eng.," May 1944, page 60. (Copy in Div. 11.)